Oct. 26, 1965  C. B. MOUNTFORT  3,214,293
PROCESS AND APPARATUS FOR PURIFYING SOLUTIONS CONTAINING SUGARS
Filed Oct. 12, 1962  4 Sheets-Sheet 1
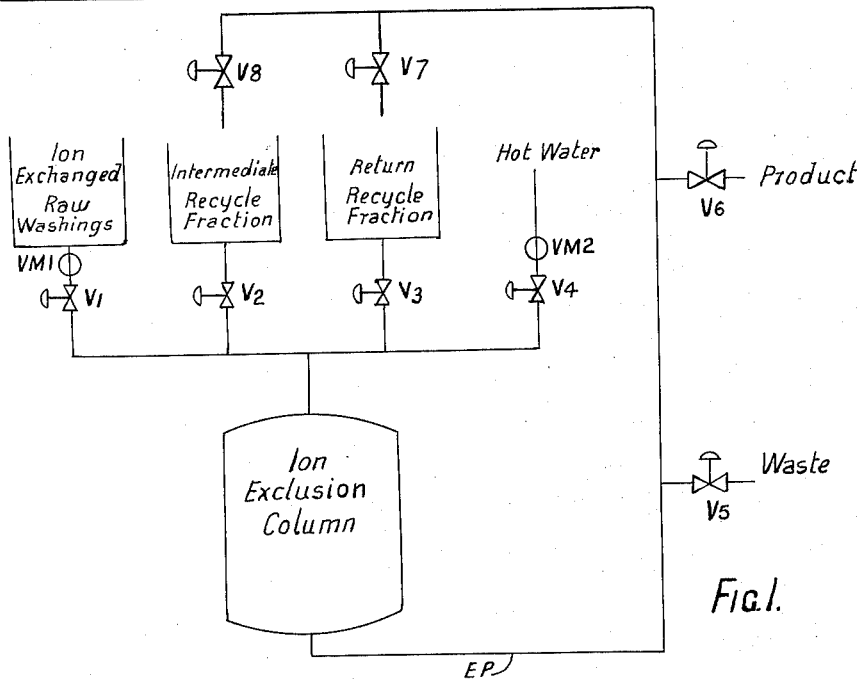
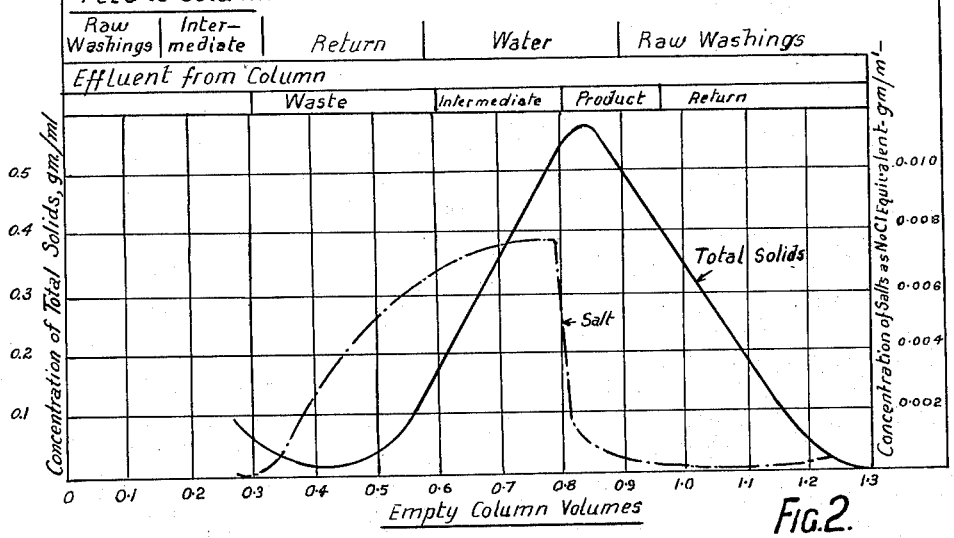

United States Patent Office 3,214,293
Patented Oct. 26, 1965

3,214,293
PROCESS AND APPARATUS FOR PURIFYING SOLUTIONS CONTAINING SUGARS
Cyril Benjamin Mountfort, Pymble, New South Wales, Australia, assignor to The Colonial Sugar Refining Company Limited, New South Wales, Australia, a company of New South Wales
Filed Oct. 12, 1962, Ser. No. 230,107
Claims priority, application Australia, Oct. 20, 1961, 10,472/61
14 Claims. (Cl. 127—9)

In the refining of raw sugar into refined products, the first conventional step is to remove the film of impurities from the raw sugar by the process of affination (mixing the raw sugar with a syrup, spinning the mixture in centrifugals and washing the sugar with water). The impurities in the film, together with some of the sugar from the crystal unavoidably dissolved in the affination process, are obtained in the form of an impure syrup called by some "affination syrup" and by others "raw washings."

It is known to treat an aqueous sugar solution containing a highly ionized solute with solid ion exchange resins in the monovalent salt form whereby the sugar is preferentially absorbed into the aqueous medium within the resin particles and the ionized solute preferentially remains within the surrounding aqueous liquid. The ionized solute is removed from contact with the ion exchange resin and subsequently the sugar solution is washed out of the ion exchange resin.

However, considerable ion exchange takes place between the resin in the monovalent salt from and the multivalent ions in the sugar solution, and frequent regeneration of the resin is necessary, and this makes the process uneconomical.

It is also known to remove substantially all of the exchangeable multivalent cations from the sugar solution before subjecting the solution to the ion exchange resin in the monovalent salt form, i.e., the excluding resin, thereby reducing the concentration of multivalent cations to such an extent that the resin will remain uncontaminated for many hundreds of cycles.

However, the product containing the sugar is very dilute and for this reason the process is not economical.

As a result of extensive experiments leading to the present invention, it has been established that by incorporating an ion exchange treatment as an integral step in an ion exclusion process, by working with higher sugar concentrations than hitherto, and by applying a recycling technique to the ion exclusion step, an economical purification of affination syrup (raw washings) can be attained.

A further object of the invention resulting from the said experiment is to apply the ion exchange, ion exclusion process to crude raw washings, that is raw washings obtained directly from the centrifugal machines used in the affination process without the necessity for prior clarification to remove colloidal material.

According to this invention, a feed solution of raw washings of the order of 70° Bx. at a temperature of the order of 110° F. is diluted with sweetwater (previously obtained from the ion exchange step) to the order of 60° Bx. and heated up to the order of 180° F. with or without de-aeration. The product is then screened to remove insoluble material, and subsequently at a temperature of the order of 180° F. passed through a column charged with a strong cation exchange resin in the monovalent salt form. Typical of such resins are sulphonated polystyrene resins cross linked with divinylbenzene. Examples of such resins are those known as Dowex 50 and Zeo Karb 225. In one practical application of this step (ion exchange) in the process, the column was packed to a height of 3 feet with Dowex 50 resin in the 16/50 mesh range with an 8% cross-linkage (percent divinylbenzene) and the flow rate was 0.69 gallon/min.(ft.²).

The effluent from the column is stored as feed for the ion exclusion step. Sugar solutions may be substituted for raw washings and these can be reduced to the required density by any convenient means.

After exhaustion of the ion exchange resin, the column is sweetened off with water, backwashed with water and regenerated by counter-current contact with a 10% sodium chloride solution—the water and sodium chloride solution being at a temperature of the order of 180° F. Upflow regeneration is achieved by using a submerged collector system. In this method, brine is pumped in at the bottom of the column and flows out through a collector system placed just below the resin surface. The regenerant is then washed out of the column by down flow of water.

By using upflow regeneration and a regenerant recovery system, it is possible to obtain a considerable economy in salt usage. The effluent regenerant is divided into two fractions. In the first cycle, the first fraction is discarded and the second fraction is stored for re-use. In the second cycle, the partially spent regenerant from the first cycle is pumped through the column and discarded. This is followed by fresh regenerant which is collected for re-use in the third cycle, and so on.

The ion exclusion step employs a column packed with a strong cation exchange resin in the monovalent salt form as herein defined. Typical of such resins are Dowex 50 and Zeo Karb 225, and best results in our experiments to date are obtained using the resin in the 50/100 mesh range and a cross-linkage of 4% (percent divinylbenzene).

The formulation of the resin used is of vital importance for the following reasons:

(i) The sucrose molecule must be able to enter and leave the resin matrix readily.

(ii) The concentration of the active groups ($SO_3Na^+$) should be high to ensure maximum exclusion of ionic material.

(iii) The resin must be mechanically strong.

(iv) The water content of the resin must be high enough to ensure appreciable capacity.

Factors (i) and (iv) favour a low cross-linked resin; factors (ii) and (iii) favour a highly cross-linked resin. Consequently a compromise is necessary on the degree of cross-linkage to be used. I chose 4% cross-linked resin but are currently considering 3%.

I have found that the degree of cross-linkage (percent divinylbenzene), gel water content, pore size and capacity of the resins vary significantly among resins of nominally the same specification. Therefore in order to select the most suitable resin from those available commercially, I have devised a simple test as outlined below:

The resin is packed in a column 1″ I.D. to a height of approx. 36 inches and backwashed and settled in the normal way. The height is measured and the bed volume calculated. A test solution is prepared by dissolving 500 gm. of sucrose and 10 gm. of sodium chloride in 1500 gm. of water. 100 ml. of this solution is passed down the column and followed with water at a rate of 8 ml./min., and the effluent collected in 8 ml. fractions. The fractions are analysed for sucrose and sodium chloride and the results plotted as:

$$\frac{C}{Co} = \frac{\text{Concentration in effluent}}{\text{Concentration in feed solution}} \text{ vs. } \frac{\text{Effluent volume}}{\text{Resin bed volume}}$$

From the curves, the differences in bed volumes at a nominal value of $C/Co$ for the sucrose and sodium chloride curves is read. In my test we selected the value of $C/Co=0.5$, and the difference at this value was the test figure. For my process, favourable results have been obtained with resins of test figures of 0.160 to 0.234.

The resin bed is confined in a column having an upper distributor above the resin surface through which either feed, recycle fractions or water may be admitted. A distributor situated at the bottom of the resin column collects the effluent. By selective operation of valves in the effluent pipe-line, the effluent may be directed to a waste line, a product line, or to recycle fraction storage tanks. Provision is made to allow the bed to be backwashed with water. In my experiments I used a bed depth of six feet, but bed depths greater and smaller than this can be used with satisfactory results.

A quantity of ion exchanged raw washings (referred to in the examples to be given herein as R.W.) at a temperature of the order of 180° F. and a concentration of between the order of 50° Bx. to 60° Bx. is fed, with or without de-aeration, to the top of the column and followed with water at a temperature of the order of 180° F. As a result of the ion exclusion action, the concentrations of sugars and non-sugars in the effluent change progressively. The quantity of feed is such that overlapping of the sugar and non-sugar components occurs in the column effluent, and the effluent is divided into the following fractions.

Fraction (1) waste: An impure fraction to be discarded; containing ionized solutes, substances of high molecular weight and colloids.

Fraction (2) intermediate (RI): An impure fraction of composition approximating the feed.

Fraction (3) product: A purified sugar solution.

Fraction (4) return (RII): A dilute sugar solution.

Fraction (5) waste. An impure fraction to be discarded; containing substances of lower molecular weight, e.g. glucose and fructose which may be recovered by evaporation of the fraction.

In the next cycle, the feed (ion exchanged raw washings) is followed by fraction (2), then by fraction (4) and then by water.

By suitable adjustment of the water volume, fraction (5) of any cycle overlaps fraction (1) of the succeeding cycle, and a combined waste fraction is discarded.

After a number of successive cycles, an equilibrium is reached. At equilibrium, the following material balances must apply.

Mass balance:

$$\text{Feed} = \text{product} + \text{waste} \quad (1)$$

This applies to total solids and to the individual components of each fraction.

Volume balance:

$$\text{Feed} + \text{water} = \text{product} + \text{waste} \quad (2)$$

If I plot the concentration of the ionic and non-ionic constituents in the effluent against the volume of effluent I obtain curves of the kind illustrated in FIGURE 6 annexed hereto.

The relative disposition of the curves for ionics and non-ionics is constant for a given resin, and given composition, concentration and flow rate of the feed solution. If I now set a limit on the purity of the waste material I discard, this will set the quantity ($vw$)—volume and weight—of the waste fraction.

The quantity of feed per cycle is thus governed by the amount of impurity I am prepared to accept in the product (Equation 1).

A typical equilibrium cycle is shown below:

FEED TO THE COLUMN 0.16 bed volumes of ion exchanged raw washings; then
0.17 bed volumes of intermediate recycle fraction (RI); then
0.26 bed volumes of return recycle fraction (RII); then
0.31 bed volumes of water

EFFLUENT FROM COLUMN 0.31 bed volumes of waste fraction
0.17 bed volumes of intermediate recycle fraction (RI)
0.16 bed volumes of product
0.26 bed volumes of return recycle fraction (RII)

The analyses of the feed and product at equilibrium for one experiment were:

| Component | Percentage by weight | |
|---|---|---|
| | Feed | Product |
| Cane sugar (CS) | 91.10 | 97.10 |
| Reducing sugar (RS) | 2.23 | 1.49 |
| Other organic matter (OOM) | 4.21 | 1.26 |
| Ash | 2.46 | 0.15 |
| | 100.00 | 100.00 |
| Density, ° Brix | 50 | 43.5 |

The purity of the waste fraction was 50.

However, in the general case the volumes of the fractions may differ from the values shown above depending on the desired purity of the waste and the desired concentration and purity of the product and on the quality of the resin.

A decrease in the volume of fraction (1) lowers the purity of the waste, and vice versa; a decrease in the volume of fraction (2) lowers the purity of the product and vice versa; and a decrease in the volume of fraction (4) decreases the concentration of the product and vice versa; but it is to be understood that an alteration in the volume of any one fraction effects the volume and quality of the other fractions and results in a new equilibrium being established.

We have found that, by increasing the concentration of impurities in the feed by a recycling technique, we can:

(1) Increase the amount of impurities discarded as waste per cycle while maintaining the same product quality, i.e., increase the feed per cycle and the productivity of the resin.

(2) Obtain the same impurity level in the waste and product fractions and the same productivity with a resin that has a lower test figure.

By increasing the concentration of impurities in the feed, the slope of the leading edge of the ionics elution curve increases and thus we can discard a larger quantity of waste of a nominated purity or the same quantity of waste at a lower purity. This is illustrated in FIGURE 7 annexed hereto.

A higher impurity level in the feed is achieved by mixing the first part of the RI fraction with the ion exchanged raw washings and using this mixture as the feed to the column.

The following examples show how the resin productivity and the product percent ash vary with the resin test and the technique of recycling. In all these examples the feed to the column had a chemical analysis as shown below:

| Component: | Percentage by weight |
|---|---|
| Cane sugar | 91.10 |
| Reducing sugar | 2.23 |
| Other organic matter | 4.21 |
| Ash | 2.46 |
| | 100.00 |

All chemical analyses are based on the dry weight of the sample.

Example 1

Resin:
 Type _____ Dowex 50W X-4
 Test figure _____ 0.160

CYCLE

| Feed to Column, B.V. | | Effluent from Column, B.V. | |
|---|---|---|---|
| R.W. at 50° Bx | 0.15 | Waste | 0.24 |
| RI | 0.16 | RI | 0.16 |
| RII | 0.24 | Product | 0.17 |
| Water | 0.26 | RII | 0.24 |
| | 0.81 | | 0.81 |

Product percent ash _____ 0.38
Productivity, tons/(ft.$^3$)(120 hr.) _____ 0.397

Example 2

Resin:
 Type _____ Dowex 50W X-4
 Test figure _____ 0.160

CYCLE

| Feed to Column, B.V. | | Effluent from Column, B.V. | |
|---|---|---|---|
| R.W. at 60° Bx | 0.12 } 0.16 | Waste | 0.27 |
| RI' | 0.04 | RI' | 0.04 |
| RI'' | 0.12 | RI'' | 0.12 |
| RII | 0.17 | Product | 0.15 |
| Water | 0.30 | RII | 0.17 |
| | 0.75 | | 0.75 |

Product percent ash _____ 0.16
Productivity, tons/(ft.$^3$)(120 hr.) _____ 0.427

Example 3

Resin:
 Type _____ Dowex 50W X-4
 Test figure _____ 0.175

CYCLE

| Feed to Column, B.V. | | Effluent from Column, B.V. | |
|---|---|---|---|
| R.W. at 50° Bx | 0.17 | Waste | 0.27 |
| RI | 0.16 | RI | 0.16 |
| RII | 0.24 | Product | 0.19 |
| Water | 0.29 | RII | 0.24 |
| | 0.86 | | 0.86 |

Product percent ash _____ 0.49
Productivity, tons/(ft.$^3$)(120 hr.) _____ 0.426

Example 4

Resin:
 Type _____ Dowex 50W X-4
 Test figure _____ 0.175

CYCLE

| Feed to Column, B.V. | | Effluent from Column, B.V. | |
|---|---|---|---|
| R.W. at 60° Bx | 0.14 } 0.17 | Waste | 0.29 |
| RI' | 0.03 | RI' | 0.03 |
| RI'' | 0.13 | RI'' | 0.13 |
| RII | 0.24 | Product | 0.17 |
| Water | 0.32 | RII | 0.24 |
| | 0.86 | | 0.86 |

Product percent ash _____ 0.25
Productivity, tons/(ft.$^3$)(120 hr.) _____ 0.426

Example 5

Resin:
 Type _____ Dowex 50W X-4
 Test figure _____ 0.175

CYCLE

| Feed to Column, B.V. | | Effluent from Column, B.V. | |
|---|---|---|---|
| R.W. at 60° Bx | 0.16 } 0.20 | Waste | 0.28 |
| RI' | 0.04 | RI' | 0.04 |
| RI'' | 0.12 | RI'' | 0.12 |
| RII | 0.24 | Product | 0.20 |
| Water | 0.32 | RII | 0.24 |
| | 0.88 | | 0.88 |

Product percent ash _____ 0.52
Productivity, tons/(ft.$^3$)(120 hr.) _____ 0.501

Example 6

Resin:
 Type _____ Dowex AG 50 X-4
 Test figure _____ 0.234

CYCLE

| Feed to Column, B.V. | | Effluent from Column, B.V. | |
|---|---|---|---|
| R.W. at 50° Bx | 0.19 | Waste | 0.38 |
| RI | 0.16 | RI | 0.16 |
| RII | 0.24 | Product | 0.19 |
| Water | 0.38 | RII | 0.24 |
| | 0.97 | | 0.97 |

Product percent ash _____ 0.09
Productivity (tons/(ft.$^3$)(120 hr.) _____ 0.428

Example 7

Resin:
 Type _____ Dowex AG 50 X-4
 Test figure _____ 0.234

CYCLE

| Feed to Column, B.V. | | Effluent from Column, B.V. | |
|---|---|---|---|
| R.W. at 50° Bx | 0.21 | Waste | 0.37 |
| RI | 0.16 | RI | 0.16 |
| RII | 0.24 | Product | 0.22 |
| Water | 0.38 | RII | 0.24 |
| | 0.99 | | 0.99 |

Product percent ash _____ 0.22
Productivity (tons/(ft.$^3$)(120 hr.) _____ 0.463

The density and conductivity of the effluent are measured continuously, and according to the composition thus determined, the effluent is sent to any one of the four destinations viz., "Waste," "Intermediate," "Product," and "Return."

The ion exclusion step may be carried out automatically.

An example of the method of automatic control and the manner in which the effluent concentrations vary is described with reference to the annexed drawings.

FIGURE 1 is a diagrammatic arrangement of the apparatus used in practising the ion exclusion step of the invention.

FIGURE 2 is a graph showing the manner in which the effluent concentration varies during a typical cycle when the invention is applied to raw washings.

According to the invention, raw washings after treatment by ion exchange to remove multivalent cations is fed to the top of the ion exclusion column, either by gravity or forced feed, and is followed by successive feed fractions, namely intermediate recycle, return recycle and hot water.

Figure 5:
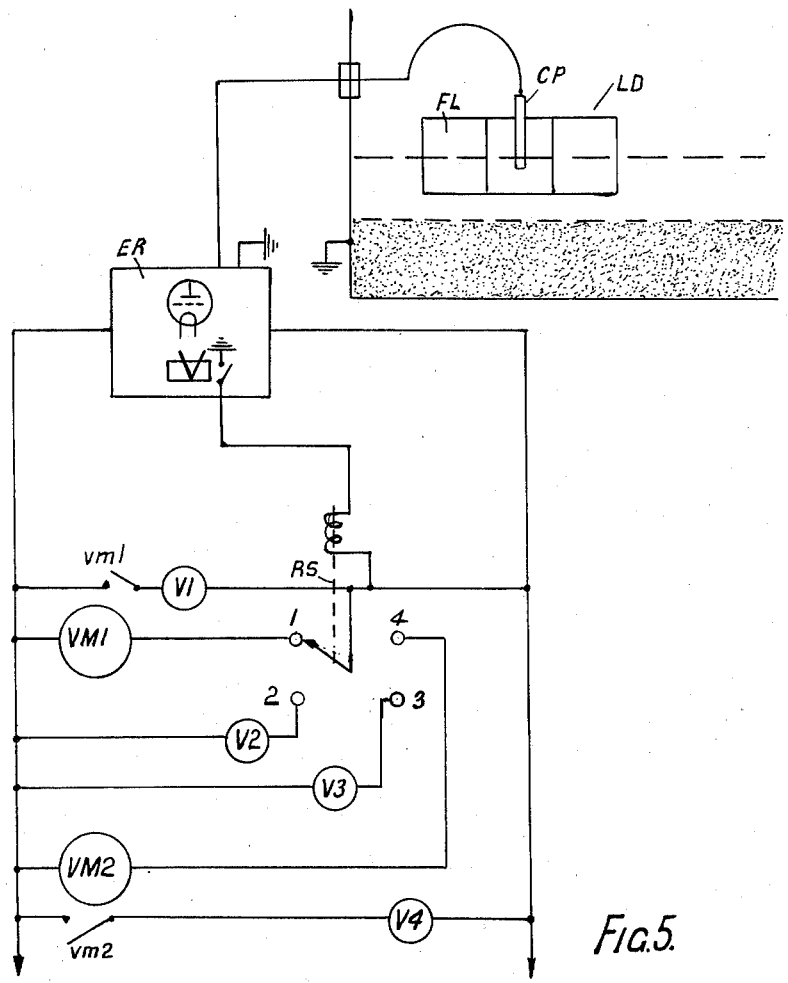
FIGURE 5 is a circuit diagram of the control system controlling the supply lines to the ion exclusion column.
Figure 6:
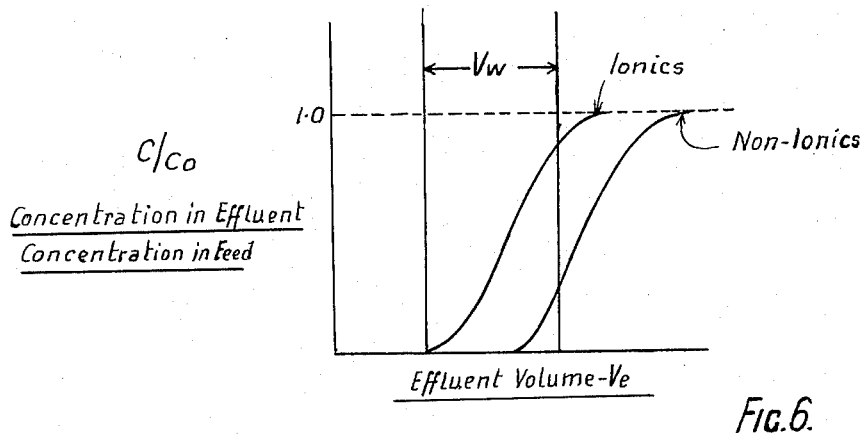
FIGURE 6 is a diagram illustrating a plotting of the concentration of the ionic and non-ionic constituents in the effluent against the volume of the effluent.
Figure 7:
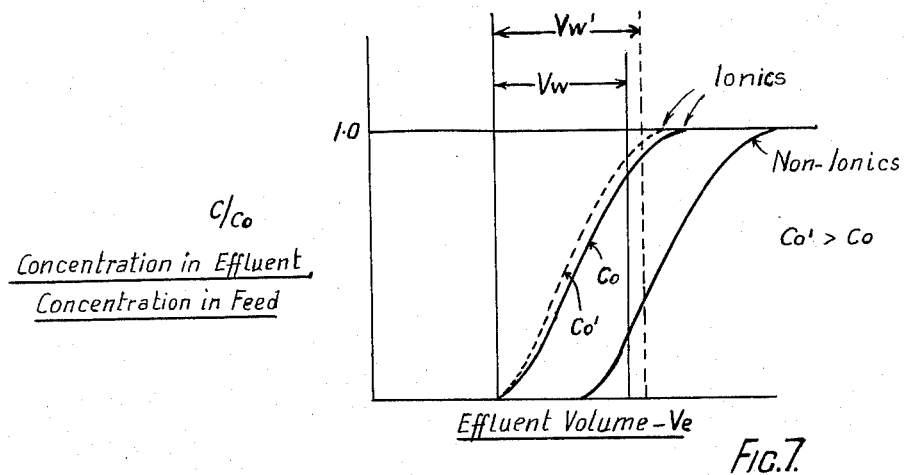
FIGURE 7 is a diagram illustrating the result of increasing the concentration of impurities in the feed.

The feed cycle control system is shown in FIGURE 5 and consists of:

(1) A differential level detector LD which is mounted in the ion exclusion column above the resin therein and which determines when the feed fractions should go on the bed.

(2) A cycle control circuit with an electronic relay ER and a rotary switch RS which introduces the feed fractions on to the bed in the correct sequence.

(3) Volume controllers VM1 and VM2 which control the quantity of ion exchanged raw washings and hot water introduced at each cycle.

The volume controllers VM1 and VM2 are a known type which on closure of a starting circuit cause a load contact to close and so open a valve in the respective pipelines. After a preset volume of liquid has passed the load contact opens and so closes the respective valve. When the starting circuit is broken the controller resets in preparation for a subsequent cycle, the load contact remaining open until the starting circuit is again closed.

The ion exchange resin in the ion exclusion column undergoes a volume change during the operating cycle (shrinking with increasing sugar concentration within the resin) and the resin surface rises and falls. In order to avoid mixing of the feed fractions, the liquid level above the moving resin surface is brought to a minimum before a feed fraction is introduced by use of the differential level detector LD in the ion exclusion column. This detector includes a float FL so constructed that its displacement is approximately ½". A conductivity probe CP is mounted on the float FL so that the probe is about ¼" above the base of the float, i.e. submerged about ¼". The float FL floats on the liquid with the probe submerged until the liquid level falls to ½" above the resin surface level. The float then seats on the resin surface while the liquid level continues to fall. When the liquid level above the resin surface falls below ¼", the liquid breaks contact with the conductivity probe CP. The conductivity probe is electrically connected to an electronic relay ER of the Thyratron type which includes a standard type relay. The contacts on this relay are open when the conductivity probe is submerged, i.e., has a low resistance to earth, and vice versa. The relay energises the feed cycle controlling rotary switch RS which opens the feed valves V1 to V4 in the correct sequence to allow a feed fraction to be introduced. The feed is admitted faster than the effluent is withdrawn, so that the liquid level can rise above the resin surface, the conductivity probe is again submerged and the electronic relay ER is reset.

At the beginning of a cycle, there is a depth of water over the resin bed surface, and effluent is being continuously withdrawn. Float FL is floating on the water with the probe CP submerged. The feed cycle control switch RS is in position 4. When the level of the water above the resin surface falls below ¼", the water breaks contact with the conductivity probe CP on the float FL. This break in contact is detected by the electronic relay ER which in turn moves the feed cycle control switch RS to position 1. This resets the volume controller VM2 by breaking its circuit at contact 4, and energises volume controller VM1 which in turn operates the solenoid controlled valve V1 by closing contact $vm1$ allowing ion exchanged raw washings to flow through the volume controller VM1 and valve V1 to the column. After the preset column of ion exchanged raw washings has passed through the volume controller VM1, valve V1 is closed by interrupting the circuit for valve V1 at contact $vm1$. As the ion exchanged raw washings flows into the column at a faster rate than the effluent is withdrawn, the level of ion exchanged raw washings above the resin surface rises, the conductivity probe CP is again submerged and the electronic relay ER is reset. When the level of ion exchanged raw washings above the resin surface falls below ¼", the ion exchanged raw washings breaks contact with the conductivity probe CP on the float FL. This break in contact is again detected by the electronic relay ER which moves the feed cycle control switch RS to position 2. This resets volume controller VM1 by breaking the circuit VM1 but this does not cause V1 to open. Solenoid operated valve V2 is now energised and opens allowing the intermediate recycle fraction to flow from the storage tank to the column at a rate faster than the effluent is withdrawn until the tank is empty. The level of the intermediate recycle fraction above the resin surface rise, the conductivity probe CP is again submerged and the electronic relay ER is reset. When the level of intermediate recycle fraction above the resin surface falls below ¼", the intermediate recycle fraction breaks contact with the conductivity probe CP on the float FL. This break in contact is again detected by the electronic relay ER which moves the feed cycle control switch RS to position 3. The circuit at contact 2 is interrupted to close valve V2, valve V3 is energised over contact 3 and allows the return recycle fraction to flow from the storage tank to the column at a rate faster than the effluent is withdrawn until the tank is empty. The level of the return recycle fraction above the resin surface rises, the conductivity probe CP is again submerged and the electronic relay ER is reset. When the level of the return recycle fraction above the resin surface falls below ¼" the return recycle fraction breaks contact with the conductivity probe CP on the float FL. This break in contact is detected by the electronic relay ER as described above and the feed cycle control switch RS moves to position 4. This movement closes valve V3 and energises the volume controller VM2 which in turn operates valve V4 by closing contact $vm2$ and allows hot water to flow through the volume controller VM2 and valve V4 to the column. After the preset volume of hot water has passed through the volume controller VM2 valve V5 is closed by the volume controller VM2 opening its contact $vm2$. As the hot water flows into the column at a faster rate than the effluent is withdrawn the level of hot water above the resin surface rises, the conductivity probe CP is again submerged and the electronic relay ER is reset. This completes one full cycle of operation.

All the feed liquors to the ion exclusion column are maintained at a temperature of the order of 180° F. and the ion exclusion column is insulated to minimise heat losses.

In any one cycle, the total recycle quantities collected from the previous cycle are fed to the column in the order described above. It may happen that the quantities of recycle materials vary from the equilibrium values, and it will be then necessary to adjust the volume of the feed of fresh ion exchanged raw washings and/or water. These adjustments may be made by measuring the quantities of recycle feed and using this measurement to alter the set point on the controller regulating the supply of fresh feed and/or water.

The effluent from the column is separated into four fractions (waste, intermediate, product and return) according to density and conductivity. This operation may be carried out automatically as follows:

The conductivity and density of the effluent are measured by conventional methods and with instruments that transmit electric or pneumatic signals to control switches. The switches are incorporated in automatic control circuits which govern the opening and closing of valves in the effluent pipeline.

According to the density and conductivity signals the valves are operated to divert the effluent to one or other of the four destinations listed above. Only one effluent valve can be open for a given combination of density and conductivity.

Figure 3:
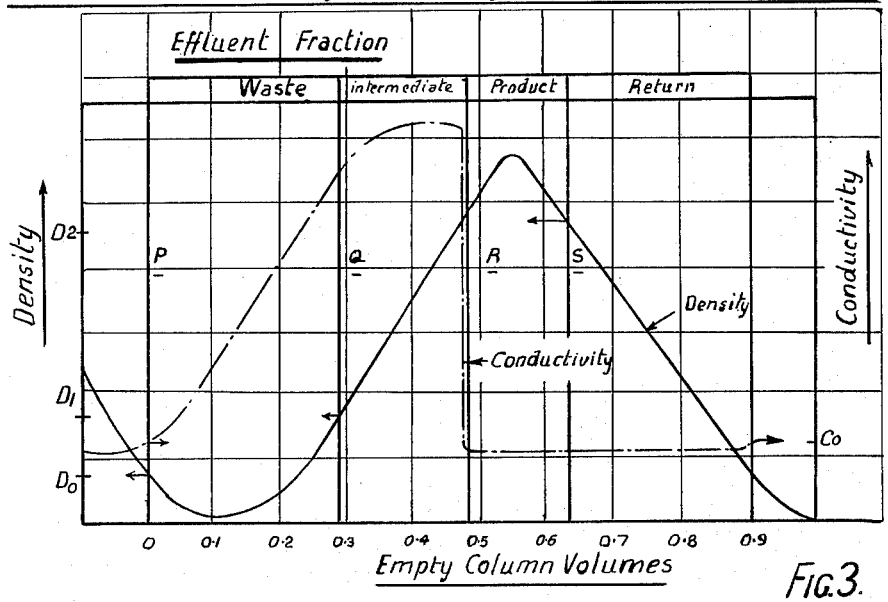
FIGURE 3 is a graph showing the manner in which the density and conductivity of the effluent vary during a typical cycle when the invention is applied to raw washings.

FIGURE 3 shows the variation in effluent density and conductivity with effluent volume and the division of the effluent into four fractions. The change over points (P, Q, R and S) between the fractions are defined by density and conductivity in the following way:

| Change over points | Density | Conductivity |
|---|---|---|
| P | ≤Do | ≤Co |
| Q | =D1 | <Co |
| R | <D2 | =Co |
| S | D2 | >Co |

The control switches referred to above are set one at each of the following values:

Do, D1, D2 for density
Co for conductivity

Typical values of these control settings used in my experiments are

Do _____ ° Bx__ 5
D1 _____ ° Bx__ 17
D2 _____ ° Bx__ 37
Co _____ mho./cm__ 25×10⁻⁴

Figure 4:
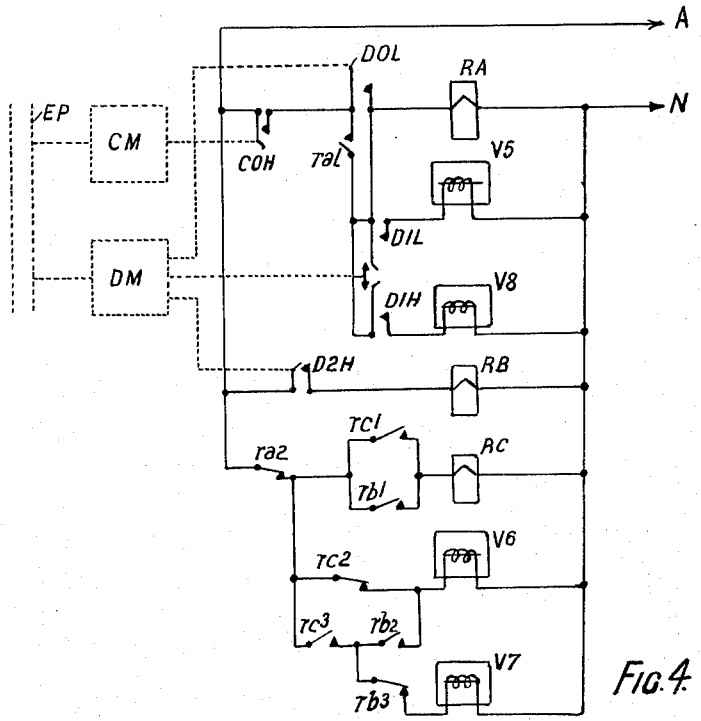
FIGURE 4 is a circuit diagram of the control system which automatically directs the effluent to one of the four destinations described earlier.

The manner in which the system operates is described below with reference to FIGURES 1 and 4. In FIGURE 4 the effluent pipe line is indicated by EP and the density and conductivity are measured by a density measurement device DM and a conductivity measurement device CM both of known structure. The density measurement device in turn controls the switches DOL, DIL, DIH and D2H, while the conductivity measurement device CM controls the switch COH as indicated by dotted lines in FIGURE 4.

A power supply is connected to the leads A and N and the solenoids opening the various valves which are normally closed are shown at V5, V8, V6 and V7. The valves are under the control of the abovementioned switches as well as relays RA, RB and RC.

When the density of the effluent has fallen below Do and the conductivity has risen above Co the switches DOL, DIL and COH are closed, establishing a circuit for the relay RA and the valve V5.

Valve V5 opens and the effluent flows to waste. Switch D1H is open so valve V8 is closed and relay contact ra2 is open so valves V6 and V7 are also closed.

When the density rises above Do the switch DOL opens but this is by-passed by relay contact ra1 so relay RA and valve V5 remain open.

When the density rises above D1 (the conductivity still being greater than Co), switch D1L opens thus interrupting the circuit to valve V5 which closes. At the same time switch D1H closes and thus opens valve V8 and the effluent is thus directed to the intermediate re-cycle fraction storage tank as shown in FIGURE 1.

The effluent continues to flow to this tank until the conductivity falls below the value Co and switch COH opens, and valve V8 closes. The circuit for the relay RA is also interrupted, contact ra2 closes and valve V6 opens by either one or two circuits, depending on whether the density is still below D2 or has risen above D2. In the former case the circuit for V6 is made via ra2 and rc2.

In the latter case when the density rose above D2 switch D2H closed and energised relay RB. This in turn closes contact rb1 and energises relay RC via ra2 and the circuit for V6 is made via ra2, rc3 and rb2.

Thus in either case valve V6 opens and the product fraction is collected.

In the former case when the density eventually rises above D2 switch D2H closes and energises relay RB. This in turn makes the circuit for relay RC via ra2 and rb1 and a circuit is maintained for V6 via rc3 and rb2.

When the density falls below D2 switch D2H opens releasing relay RB and opening rb1 and rb2 and closing rb3. The opening of rb1 does not release RC because of the locking contact rc1. The opening of rb2 closes valve V6 because rc2 is also open, and the closing of rb3 opens valve V7 via ra2, rc3 and rb3. The effluent now flows to the return recycle fraction storage tank.

The effluent continues to flow to this tank until the density falls below Do and the conductivity rises above Co when the circuit for relay RA is re-established. This opens contact ra2 which releases relay RC and closes valve V7. At the same time valve V5 opens as described above, and the effluent is again discarded to waste.

The effluent flow is controlled at a rate of the order of 0.7 g.p.m./ft.²

While we have illustrated, in detail, the application of our invention to unclarified raw washings, the invention may be applied to any solution containing sugars. The process of purification may be achieved also using moving beds instead of fixed beds of resin.

The following examples illustrate the application of the process to typical syrups encountered in raw sugar manufacture.

A typical operating cycle was as follows:

| To the Column | Bed Volume | From the Column | Bed Volume |
|---|---|---|---|
| Feed Syrup at 50° Bx | 0.108 | Waste Fraction | 0.344 |
| Intermediate Fraction (RI) | 0.206 | Intermediate Fraction | 0.206 |
| Return Fraction (RII) | 0.189 | Product at 31.5° Bx | 0.146 |
| Water | 0.382 | Return Fraction | 0.189 |
| | 0.885 | | 0.885 |

The feed rate was 40 g.p.h./ft.² and the temperature 80° C. The column was 6 feet high.

Some typical results were:

| | Feed | Product | Feed | Product |
|---|---|---|---|---|
| | (Percentage by weight) | | (Percentage by weight) | |
| Cane Sugar | 79.71 | 90.74 | 73.77 | 86.97 |
| Reducing Sugar | 5.46 | 4.23 | 6.11 | 4.80 |
| Other Organic Matter | 6.49 | 2.69 | 12.04 | 4.66 |
| Ash | 8.34 | 2.34 | 8.08 | 3.57 |
| | 100.00 | 100.00 | 100.00 | 100.00 |

The purity of the waste stream was 20.

The purification of crude affination syrup by ion exclusion was also achieved in a semi-continuous countercurrent manner. The apparatus used was the known Higgins contactor. This apparatus provides a dense resin bed which is moved vertically upwards a few inches at a time at frequent intervals. Feed solution is introduced near the middle of the column, waste fraction is withdrawn at the bottom and the product some distance above the feed inlet. Water is fed to the top of the column.

In a typical trial, the feed rate was 7.3 g.p.h./ft.² and the temperature 80° C. The active resin suction between the water inlet and the waste outlet was 15 feet and the resin was moved at 9 feet per hour.

The feed and product analysis obtained during a typical experiment were:

|  | Affination Syrup | Product |
|---|---|---|
|  | (Percentage by weight) | |
| Cane Sugar | 90.21 | 95.86 |
| Reducing Sugar | 2.26 | 2.18 |
| Other Organic Matter | 5.16 | 1.80 |
| Ash | 2.37 | 0.16 |
|  | 100.00 | 100.00 |
| Density, ° Brix | 50 | 35 |

The purity of the waste was 45 and the productivity 0.16 tons (120 hour) (ft.³).

I claim:

1. Process for purifying solutions containing sugar, said process comprising:
   diluting an impure sugar solution of about 70° Bx. at a temperature of about 110° F. with sweetwater to produce a diluted solution of about 60° Bx.;
   heating the diluted solution to a temperature of about 180° F.;
   screening the diluted solution to remove insoluble matter;
   passing the diluted, screened and heated solution through a column charged with a strong cation exchange resin in the monovalent salt form to remove multivalent cations;
   collecting the ion exchanged effluent and regenerating the column by an upflow of regenerating solution containing 10% NaCl, at a temperature of the order of 180° F.;
   feeding the ion-exchanged sugar solution into the top of an ion-exclusion column charged with a strong cation exchange resin in the monovalent salt form having a 4% cross-linkage of divinylbenzene at a temperature of the order of 180° F. and a concentration of between 50°–60° Bx. followed by water at the same temperature;
   separating the effluent leaving said ion exclusion column into fractions namely: waste, impure composition, purified sugar solution and dilute sugar solution;
   and then admitting to the ion exclusion column additional ion exchanged sugar solution followed by impure composition, then the dilute sugar solution then water all at a temperature of about 180° F. and in a manner whereby re-mixing of the separated fractions is avoided.

2. Process for purifying solutions containing sugar according to claim 1 wherein the sugar solution is screened raw washings diluted with sweetwater obtained in an ion exchange operation.

3. Process for purifying solutions containing sugar, said process comprising passing a sugar solution diluted to the order of 60° Bx. at a temperature of 180° F. through a column charged with a strong cation exchange resin in the monovalent salt form, collecting the ion exchanged effluent and regenerating the column by an upflow of regenerating solution; feeding the ion exchanged sugar solution into the top of an ion exclusion column charged with a strong cation exchange resin in the monovalent form followed by water both at an elevated temperature, separating the effluent from said column into fractions namely: waste, impure composition, purified sugar solution and dilute sugar solution; admitting to the ion exclusion column additional ion exchanged sugar solution followed by impure composition, then the dilute sugar solution then water all at an elevated temperature in a manner whereby re-mixing of the separated fractions is avoided, maintaining the ion exclusion column at a temperature of the order of 180°. F.

4. Process for purifying solutions containing sugar according to claim 3 wherein for the ion exchange step the sugar solution is of the order of 70° Bx. at a temperature of the order of 110° F. and is diluted with sweetwater from the ion exchange step to the order of 60° Bx. and is heated to a temperature of the order of 180° F.

5. Process for purifying solutions containing sugar, said process comprising diluting a feed solution of raw washings with sweetwater to the order of 60° Bx. and passing the product at an elevated temperature through a column charged with the sodium salt of a sulphonated polystyrene resin cross-linked with 8% divinylbenzene in the 16/50 mesh range, collecting the ion exchanged effluent and feeding the same into the top of an ion exclusion column charged with the sodium salt of a sulphonated polystyrene resin cross-linked with 4% divinylbenzene in the 50/100 mesh range followed by water both at an elevated temperature, separating the effluent from said column into fractions namely: waste, impure composition, purified sugar solution and dilute sugar solution; admitting to the ion exclusion column additional ion exchanged sugar solution followed by impure composition, then the dilute sugar solution then water all at an elevated temperature in a manner whereby re-mixing of the separated fractions is avoided, maintaining the ion exclusion column at a temperature of the order of 180° F.

6. Process for purifying solutions containing sugar, said process comprising diluting a sugar solution of the order of 70° Bx. at a temperature of the order of 110° F. with sweetwater from an ion exchange step to the order of 60° Bx. and heating the same to the order of 180° F., passing said sugar solution through a column charged with the sodium salt of a sulphonated polystyrene resin cross-linked with 8% divinyl benzene in the 16/50 mesh range, collecting the ion exchanged effluent and regenerating the column by an upflow of regenerating solution, feeding the ion exchanged effluent into the top of an ion exclusion column charged with the sodium salt of a sulphonated polystyrene resin cross-linked with 4% divinylbenzene in the 50/100 mesh range followed by water both at an elevated temperature, separating the effluent from said column into fractions namely: waste, impure composition, purified sugar solution and dilute sugar solution; admitting to the ion exclusion column additional ion exchanged sugar solution followed by impure composition, then the dilute sugar solution then water all at an elevated temperature in a manner whereby re-mixing of the separated fractions is avoided, maintaining the ion exchange column at a temperature of the order of 180° F.

7. Process for purifying solutions containing sugar according to claim 6 wherein for the ion exchange step upflow regeneration is achieved by pumping brine into the column at the bottom and exhausting the brine through a collector located just below the resin surface.

8. Process for purifying solutions containing sugar, said process comprising diluting a feed solution of raw washings with sweetwater to the order of 60° Bx. and passing the product at an elevated temperature through a column charged with the sodium salt of a sulphonated polystyrene resin cross-linked with 8% divinylbenzene in the 16/50 mesh range, collecting the ion exchanged effluent and feeding the same into the top of an ion exclusion column charged with the sodium salt of a sulphonated polystyrene resin cross-linked with 4% divinylbenzene in the 50/100 mesh range followed by water both at an elevated temperature, maintaining the ion exclusion column at a temperature of the order of 180° F., dividing the effluent from the ion exclusion column initially into five fractions in the following order namely:

(1) waste containing ionised solutes, substances of high molecular weight and colloids,
(2) an impure fraction of composition approximating the feed, (3) a purified sugar solution,
(4) a dilute sugar solution,
(5) waste containing substances of low molecular weight, and by adjustment of the water volume the fraction (5) of any cycle overlaps the fraction (1) of the succeeding cycle and as a combined waste fracton is discarded.

9. Process for purifying solutions containing sugar according to claim 8 wherein re-mixing of the re-cycled fractions in the ion exclusion column is avoided by bringing the level of liquid therein to just above the level of the resin therein before the next feed fraction is admitted and wherein the effluent from the ion exclusion step is separated into four fractions according to density and conductivity measured by instruments which activate electric switch means whereby valves in an effluent pipe line are actuated to divert the effluent to any one of four outlets characterised in that only one valve can be opened for a given combination of density and conductivity and wherein the density and conductivity of the change over points between fractions of the effluent from the ion exclusion column is defined as:

| Fraction | Density, °Bx. | Conductivity, mho./cm. |
|---|---|---|
| 1 | <5 | >25×10⁻⁴ |
| 2 | >17 | >25×10⁻⁴ |
| 3 | >37 | <25×10⁻⁴ |
| 4 | <37 | <25×10⁻⁴ | and the electrical switch means are set to operate one at each of the following values:

(Density): 5° Bx., 17° Bx., 37° Bx.
(Conductivity): $25 \times 10^{-4}$ mho./cm.

10. Apparatus for carrying out ion exclusion process of purifying ion exchanged raw washings of solutions containing sugar comprising an ion exclusion column packed with a strong cation exchange resin in the monovalent salt form and having an inlet at the top and an outlet at the bottom, said inlet having pipes connecting to an ion exchanged raw washings supply, to an intermediate recycle fraction supply, to a return recycle fraction supply and to a hot water supply, all said connecting pipes having control valves therein; said outlet having an effluent pipe connecting to a waste pipe, to a product delivery pipe to the return recycle fraction supply and to the intermediate recycle fraction supply, all said effluent connected pipes having control valves therein; means to control the operation of all of said valves.

11. Apparatus for carrying out the ion exclusion process for purifying ion exchanged raw washings according to claim 10 wherein the means to control the operation of the valves to the pipes connected to the effluent pipe comprise density measurement device and a conductivity measurement device arranged to be activated by the effluent in the effluent pipe line, switches in an electric circuit arranged to be actuated by said density and conductivity measurement devices, electric means energised by the operation of said switches to open and close said valves.

12. Apparatus for carrying out ion exclusion process of purifying ion exchanged raw washings of solutions containing sugar comprising an ion exclusion column packed with a strong cation exchange resin in the monovalent salt form and having an inlet at the top and an outlet at the bottom, said inlet having pipes connecting to an ion exchanged raw washings supply, to an intermediate recycle fraction supply, to a return recycle fraction supply and to a hot water supply, all said connecting pipes having control valves therein; said outlet having an effluent pipe connecting to a waste pipe, to a product delivery pipe to the return recycle fraction supply and to the intermediate recycle fraction supply all said effluent connected pipes having control valves therein; means to control the operation of the valves which control the delivery of ion exchanged raw washings and hot water to the ion exclusion column, said means comprising a volume controller in each of the inlet pipes connecting said column to the ion exchanged raw washings supply and the hot water supply between the valves therein and the supply source and arranged to actuate said valves, said volume controllers being controlled in their operation by a differential level detector in the ion exclusion column and an electronic relay actuated thereby, a step by step switch in an electric circuit controlled by said relay to control the actuation of said volume controllers.

13. Apparatus for carrying out the ion exclusion process of purifying ion exchanged raw washings according to claim 12 wherein the means to control the operation of the valves which control the delivery of the intermediate recycle fraction and the return recycle fraction to the ion exclusion column comprise a differential level detector in the ion exclusion column and an electronic relay actuation thereby to control the actuation of said valves.

14. Apparatus according to claim 12 wherein the means to control the operation of the valves which control the delivery of the immediate recycle fraction and the return recycle fraction to the ion exclusion column comprises a differential level detector in the ion exclusion column and an electronic relay actuated thereby to control the actuation of the valves, said differential level detector comprising a float incorporating a conductivity probe mounted in the ion exclusion column above the resin therein and both constructed so that the base of the float is normally submerged approximately ½″ and the conductivity probe is submerged approximately ¼″ and the electronic relay is energised when the liquid in the ion exclusion column falls below the conductivity probe.

References Cited by the Examiner
UNITED STATES PATENTS
2,771,193   11/63   Simpson et al.

FOREIGN PATENTS
209,093   7/57   Australia.

MORRIS O. WOLK, *Primary Examiner.*